United States Patent
Cowart et al.

(10) Patent No.: US 7,500,142 B1
(45) Date of Patent: Mar. 3, 2009

(54) PRELIMINARY CLASSIFICATION OF EVENTS TO FACILITATE CAUSE-BASED ANALYSIS

(75) Inventors: Robert Cowart, Kennesaw, GA (US); Ray Jenkins, Alpharetta, GA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/313,284

(22) Filed: Dec. 20, 2005

(51) Int. Cl.
*G06F 11/00* (2006.01)

(52) U.S. Cl. ............................. 714/25; 714/37; 714/38; 702/183; 702/184; 702/185

(58) Field of Classification Search .................. 714/26, 714/37
See application file for complete search history.

(56) References Cited

U.S. PATENT DOCUMENTS

| | | | | |
|---|---|---|---|---|
| 5,127,005 A * | 6/1992 | Oda et al. | ...................... | 714/26 |
| 5,661,668 A * | 8/1997 | Yemini et al. | ................ | 702/186 |
| 6,012,152 A * | 1/2000 | Douik et al. | ................... | 714/26 |
| 6,124,790 A * | 9/2000 | Golov et al. | ................ | 340/508 |
| 6,249,755 B1 * | 6/2001 | Yemini et al. | ................ | 702/183 |
| 6,615,367 B1 * | 9/2003 | Unkle et al. | ................... | 714/26 |
| 6,651,183 B1 * | 11/2003 | Gensler et al. | ................. | 714/4 |
| 6,738,933 B2 * | 5/2004 | Fraenkel et al. | ............... | 714/47 |
| 7,013,411 B2 * | 3/2006 | Kallela et al. | ................. | 714/47 |
| 7,020,536 B2 * | 3/2006 | Lin et al. | ..................... | 700/110 |
| 7,043,661 B2 * | 5/2006 | Valadarsky et al. | ............ | 714/4 |
| 7,100,195 B1 * | 8/2006 | Underwood | .................... | 726/2 |
| 7,107,185 B1 * | 9/2006 | Yemini et al. | ............... | 702/183 |
| 7,131,032 B2 * | 10/2006 | Gibson et al. | ................ | 714/26 |
| 7,131,037 B1 * | 10/2006 | LeFaive et al. | ................ | 714/46 |
| 7,146,586 B2 * | 12/2006 | Bohl et al. | ...................... | 716/4 |
| 7,159,146 B2 * | 1/2007 | Bowers et al. | ................ | 714/37 |
| 7,171,337 B2 * | 1/2007 | Yuan et al. | ................... | 702/185 |
| 7,176,792 B2 * | 2/2007 | Pereira et al. | ............... | 340/506 |
| 7,191,364 B2 * | 3/2007 | Hudson et al. | ................ | 714/38 |
| 7,213,174 B2 * | 5/2007 | Dahlquist et al. | ............. | 714/37 |
| 7,315,826 B1 * | 1/2008 | Guheen et al. | ................. | 705/7 |
| 7,349,889 B1 * | 3/2008 | Alling et al. | .................. | 706/46 |
| 7,350,107 B2 * | 3/2008 | Thaler et al. | .................. | 714/26 |
| 7,379,846 B1 * | 5/2008 | Williams et al. | ............ | 702/185 |
| 2003/0149586 A1 * | 8/2003 | Chen et al. | ...................... | 705/1 |
| 2003/0188189 A1 * | 10/2003 | Desai et al. | .................. | 713/201 |
| 2004/0181709 A1 * | 9/2004 | Gibson et al. | ................. | 714/25 |
| 2004/0250166 A1 * | 12/2004 | Dahlquist et al. | ............. | 714/37 |
| 2004/0268184 A1 * | 12/2004 | Kaminsky et al. | ............. | 714/38 |
| 2005/0015217 A1 * | 1/2005 | Weidl et al. | .................. | 702/185 |
| 2005/0038827 A1 * | 2/2005 | Hooks | ........................ | 707/200 |
| 2005/0043922 A1 * | 2/2005 | Weidl et al. | .................. | 702/183 |
| 2005/0049988 A1 * | 3/2005 | Dahlquist et al. | ............. | 706/46 |
| 2005/0097396 A1 * | 5/2005 | Wood | .......................... | 714/25 |

(Continued)

*Primary Examiner*—Robert Beausoliel
*Assistant Examiner*—Joshua P Lottich
(74) *Attorney, Agent, or Firm*—Steh H. Ostrow; Dreier LLP

(57) ABSTRACT

The present invention provides methods and systems for performing preliminary cause-based classification of events in a computer or networked computer system. Methods are provided in which, based on an event message, cause-based preliminary classification of an associated event is performed. The result of the preliminary classification is used to facilitate subsequent cause-based analysis, such as root cause analysis, relating to the event. Methods are provided in which preliminary classification is performed using a database including a catalog associating event messages with appropriate preliminary classifications of events associated with the event messages.

10 Claims, 5 Drawing Sheets

U.S. PATENT DOCUMENTS

| | | | |
|---|---|---|---|
| 2005/0146426 A1* | 7/2005 | Pereira et al. | 340/506 |
| 2005/0210331 A1* | 9/2005 | Connelly et al. | 714/26 |
| 2005/0257103 A1* | 11/2005 | Choudhary et al. | 714/100 |
| 2005/0278273 A1* | 12/2005 | Uthe | 707/1 |
| 2006/0041659 A1* | 2/2006 | Hasan et al. | 709/224 |
| 2006/0048010 A1* | 3/2006 | Tai et al. | 714/37 |
| 2006/0085689 A1* | 4/2006 | Bjorsne | 714/39 |
| 2006/0095853 A1* | 5/2006 | Amyot et al. | 715/744 |
| 2006/0112061 A1* | 5/2006 | Masurkar | 706/47 |
| 2006/0248389 A1* | 11/2006 | Thaler et al. | 714/26 |
| 2007/0112746 A1* | 5/2007 | Todhunter | 707/4 |
| 2007/0288219 A1* | 12/2007 | Zafar et al. | 703/14 |

* cited by examiner

PRELIMINARY CLASSIFICATION OF EVENTS TO FACILITATE CAUSE-BASED ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to the following commonly owned applications, each of which is hereby incorporated herein by reference in its entirety:

Application entitled "Systems and Methods for Containment Modeling and Network Rediscovery", filed concurrently herewith, U.S. patent application Ser. No. 11/313,292;

Application entitled "Method and System for Autopartitioning of Network Topologies", filed concurrently herewith, U.S. patent application Ser. No. 11/313,558;

Application entitled "Control Plane Event Normalization and Correlation", filed concurrently herewith, U.S. patent application Ser. No. 11/313,273;

Application entitled "Systems and Methods for BGP Discovery and Root Cause Analysis Within a Communication Network", filed concurrently herewith, U.S. patent application Ser. No. 11/313,215; and Application entitled "Systems and Methods for Flexible Use of Event Suppression With a Communications Network", filed concurrently herewith, U.S. patent application Ser. No. 11/313,234.

BACKGROUND OF THE INVENTION

This invention relates in general to classification and analysis of events within a computer or computer network, and in particular to methods and systems for performing preliminary cause-based classification of events to facilitate cause-based analysis.

As computer networks become increasingly important and complex, so do the tasks of monitoring, evaluating, maintaining, managing, and trouble-shooting in connection with network-associated functioning and communications.

Computer networks can generally be described as including nodes, with various interconnections allowing messaging, communications, or interaction between nodes. Nodes can be or include a wide variety of physical or conceptual components, such as computers, servers, clients, routers, hubs, switches, bridges, software, applications, programming modules, and other components. The route of a communication from a source node to a destination node may depend on a variety of factors, such as network configuration, efficiency, traffic, hardware or software availability, etc.

Certain events or conditions occurring or existing within a network, (which together may be broadly referred to as events), may trigger or cause event messages to be generated and stored relating to the events or conditions. The event messages may relate to any of a variety of situations or conditions, including, for example, status messages, error messages, alert messages, alarm messages, informational messages, and others. The messages may contain various pieces, sets, or fields of information relating to the event, such as, for example, where (physically or conceptually), or in connection with what communication, the event occurred, when the event occurred, information concerning the nature of the event, circumstances associated with the event, parameters associated with the event, and other information.

Often, it is desired or required to perform cause-based analysis with regard to an event. Cause-based analysis can include root cause analysis and determining cause-based relevancy relating to the event or related or associated events. For example, cause-based analysis may be used to determine or attempt to determine whether the event was caused by another event or condition, whether the event caused another event or condition, whether the event is a root cause or cause of a series or chain of events or conditions, or other cause-related information. Such cause-based analysis may be useful or necessary to determine the appropriate action or conduct to take with respect to the computer network in light of the event or events. For instance, if an event message indicates a problem in the network, cause-based analysis may be needed to determine or facilitate determination of what corrective, remedial, or proactive measures may need to be taken to correct the problem, cause or causes of the problem, or symptom or symptoms of the problem, or to prevent further related problems.

Computer network management methods and systems are known in the art. "Integrated Network Management VII: Integrated Management Strategies for the New Millennium", 2001 IEEE/IFIP International Symposium on Integrated Network Management Proceedings, edited by George Pavlou, Nikos Anerousis, and Antonio Liotta, discusses network management strategies including fault analysis and management.

"Expert Systems Applications in Integrated Network Management", edited by Eric C. Ericson, Lisa Traeger Ericson and Daniel Minoli, discusses network management including alarm monitoring and analysis.

U.S. Pat. No. 5,392,328, issued on Feb. 21, 1995, and entitled, "System and Method for Automatically Detecting Root Causes of Switching Connection Failures in a Telephone Network" discusses root cause detection and error message processing.

U.S. Pat. No. 6,012,152, issued on Jan. 4, 2000, and entitled, "Software Fault Management System" discusses fault management in a mobile telecommunications network.

FIG. 1 depicts a prior art computer network 100. The network 100 includes a number of nodes, including a source node 102 from which a data packet 106 is sent and a destination node 104 which is the ultimate destination of the data packet 106. The data packet 106 traverses a route through nodes of the network 100 as depicted by interconnections 108, 110, 112, 114, and 116. As a consequence of some event (which can be an event or condition) occurring or existing in the network 100, event messages E1, E2, and E3 are stored at nodes 118, 120, and 122. Event information 124, which may include event messages E1, E2 and E3, is collected and communicated to a database for later use and analysis.

Cause-based analysis, such as root cause analysis or cause relevancy determination, may be performed with respect to each of the events indicated by the event messages E1, E2, and E3. In many instances, the faster, more efficient, or more accurate the cause-based analysis or determination, the faster and more effectively appropriate responsive or corrective action or conduct may be taken. For example, if the event messages are alert or error messages, then the faster, more efficiently, or more accurately cause-based analysis is performed relating to the event messages, the faster and more effectively any remedial, corrective, or proactive action may be identified and taken. Furthermore, timely and appropriate action may greatly limit negative or costly consequences of problems, such as by allowing timely re-establishment of effective communications or interaction between network nodes. Additionally, more efficient cause-based analysis means that less time, computing power and resources need to be expended to perform the cause-based analysis.

There is a need for methods and systems to facilitate cause-based analysis in a networked computer system.

SUMMARY OF THE INVENTION

In some embodiments, the invention provides methods and systems for performing preliminary cause-based classification of events in a computer or networked computer system. In some embodiments, based on an event message, preliminary cause-based classification of an event associated with the event message is performed. The results of the preliminary classification can be used to facilitate subsequent cause-based analysis relating to the event, which can include root cause analysis, cause relevancy determination, or actual cause-based classification determination. In some embodiments, preliminary classification is performed using a database including a catalog associating events or event types with appropriate preliminary classifications of the events.

Event messages may be obtained from a networked computer system, such as event messages stored at one or more nodes of the networked computer system. The event messages may be received by and stored in one or more databases accessible by one or more server computers. The server computers may include a cause-based preliminary classification program or engine for cause-based preliminary classification of events associated with the event messages. The preliminary classification may include, prior to cause-based analysis relating to events, determining most likely cause-based classifications of events based on associated event messages. The determined preliminary classification of events may be used to facilitate cause-based analysis relating to events. For example, the preliminary classification may provide useful input for cause-based analysis, and may be useful in increasing the speed, efficiency, or accuracy of such cause-based analysis.

In one embodiment, the invention provides a method for facilitating cause-based analysis relating to computer-related events. The method includes obtaining, from a computer, a plurality of event messages, each of the event messages relating to an event associated with the computer, and the plurality of event messages including a first event message associated with a first event. The method further includes, prior to performing cause-based analysis relating to the first event, performing preliminary cause-based classification of the first event to determine a preliminary cause-based classification of the first event from among a plurality of possible cause-based classifications, in which the preliminary cause-based classification is performed based on the first event message. The method further includes using the determined cause-based preliminary classification of the first event to facilitate cause-based analysis relating to the first event.

In another embodiment, the invention provides a method for facilitating cause-based analysis relating to events in a networked computer system. The method includes obtaining, from the networked computer system, a plurality of event messages, each of the event messages relating to an event within the networked computer system, and the plurality of event messages including a first event message associated with a first event. The method further includes, prior to performing cause-based analysis relating to the first event, performing preliminary cause-based classification of the first event to determine a preliminary cause-based classification of the first event from among a plurality of possible cause-based classifications, in which the preliminary cause-based classification is performed based on the first event message. The method further includes using the determined cause-based preliminary classification of the first event to facilitate cause-based analysis relating to the first event.

In another embodiment, the invention provides a system for facilitating cause-based analysis relating to events in a networked computer system. The system includes one or more server computers, one or more event message databases connected to the one or more server computers, and one or more preliminary cause-based classification databases connected to the one or more server computers. The one or more event message databases are adapted to receive and store a plurality of event messages, each of the event messages relating to an event within the networked computer system, and the plurality of event messages including a first event message associated with a first event. At least one of the one or more server computers is adapted to, prior to cause-based analysis relating to the first event being performed, perform preliminary cause-based classification of the first event to determine a cause-based preliminary classification of the first event from among a plurality of possible cause-based preliminary classifications, in which the preliminary cause-based classification is performed based on comparing the first event message with information contained in the one or more cause-based preliminary classification databases. At least one of the one or more server computers is adapted to use the determined preliminary cause-based classification of the first event to facilitate cause-based analysis relating to the first event.

In another embodiment, the invention provides a computer usable media storing program code which, when executed on one or more computerized devices, causes the computerized devices to execute a method for facilitating cause-based analysis relating to events in a networked computer system. The method includes obtaining, from a networked computer system, a plurality of event messages, each of the event messages relating to an event within the networked computer system, and the plurality of event messages including a first event message associated with a first event. The method further includes, prior to performing cause-based analysis relating to the first event, performing preliminary cause-based classification of the first event to determine a most likely cause-based classification of the first event from among a plurality of possible cause-based classifications, in which the preliminary cause-based classification is performed based on the first event message. The method further includes using the determined most likely cause-based classification of the first event to facilitate cause-based analysis relating to the first event.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Herein, unless otherwise indicated, the term "event message" can include a message relating to an event or condition. Furthermore, unless otherwise indicated, the term "event" can include an event or a condition.

Herein, the term "cause-based preliminary classification" means and is synonymous with "preliminary cause-based classification".

Herein, the invention is described primarily with reference to events within a networked computer system. However, it is to be understood that, in come embodiments, the invention includes cause-based preliminary classification of events within a single computer or computing environment. For example, in some embodiments, the invention includes cause-based preliminary classification of events within single computer that includes physically or conceptually separate or modular components or aspects, which may communicate or interact with each other.

Figure 1:
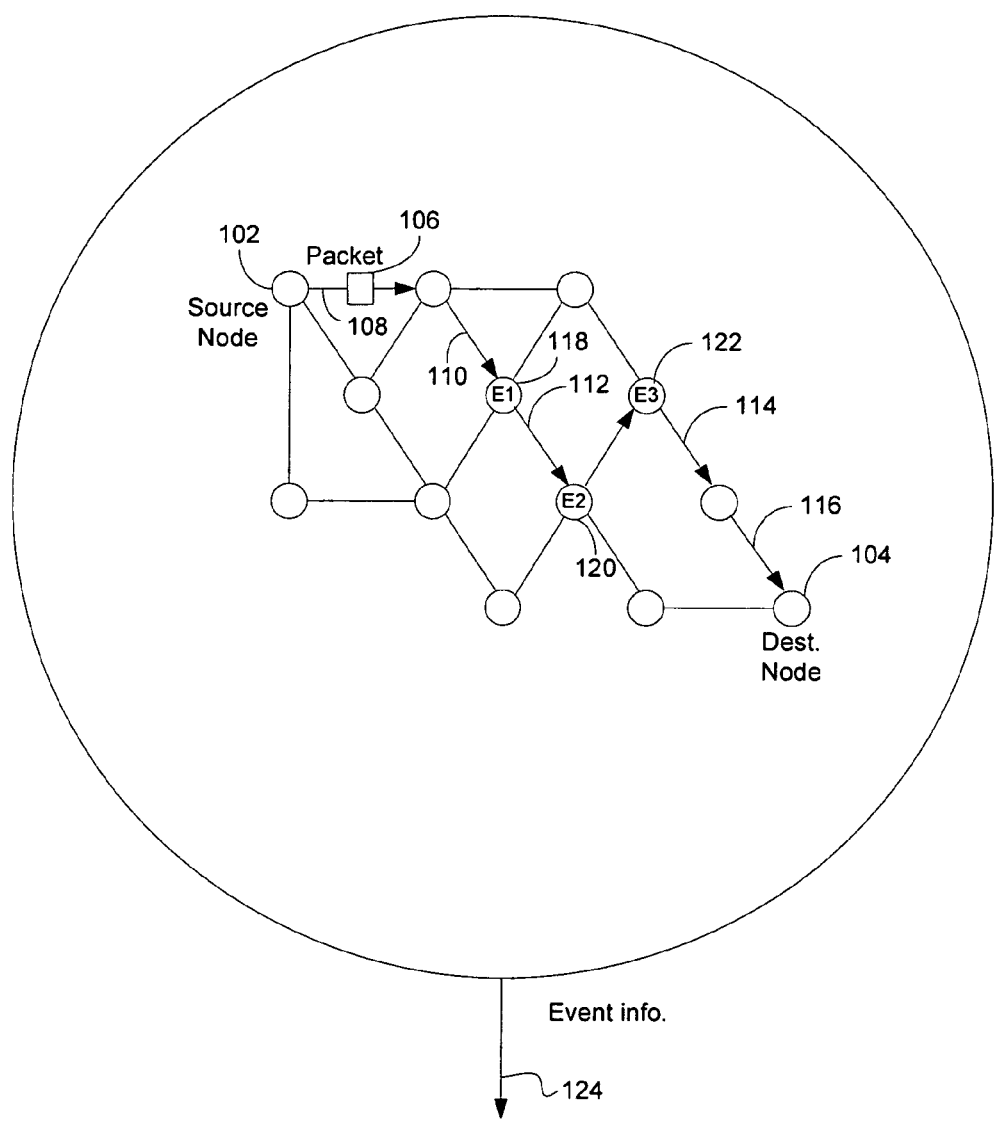
FIG. 1 is a block diagram of prior art networked computer system.
Figure 2:
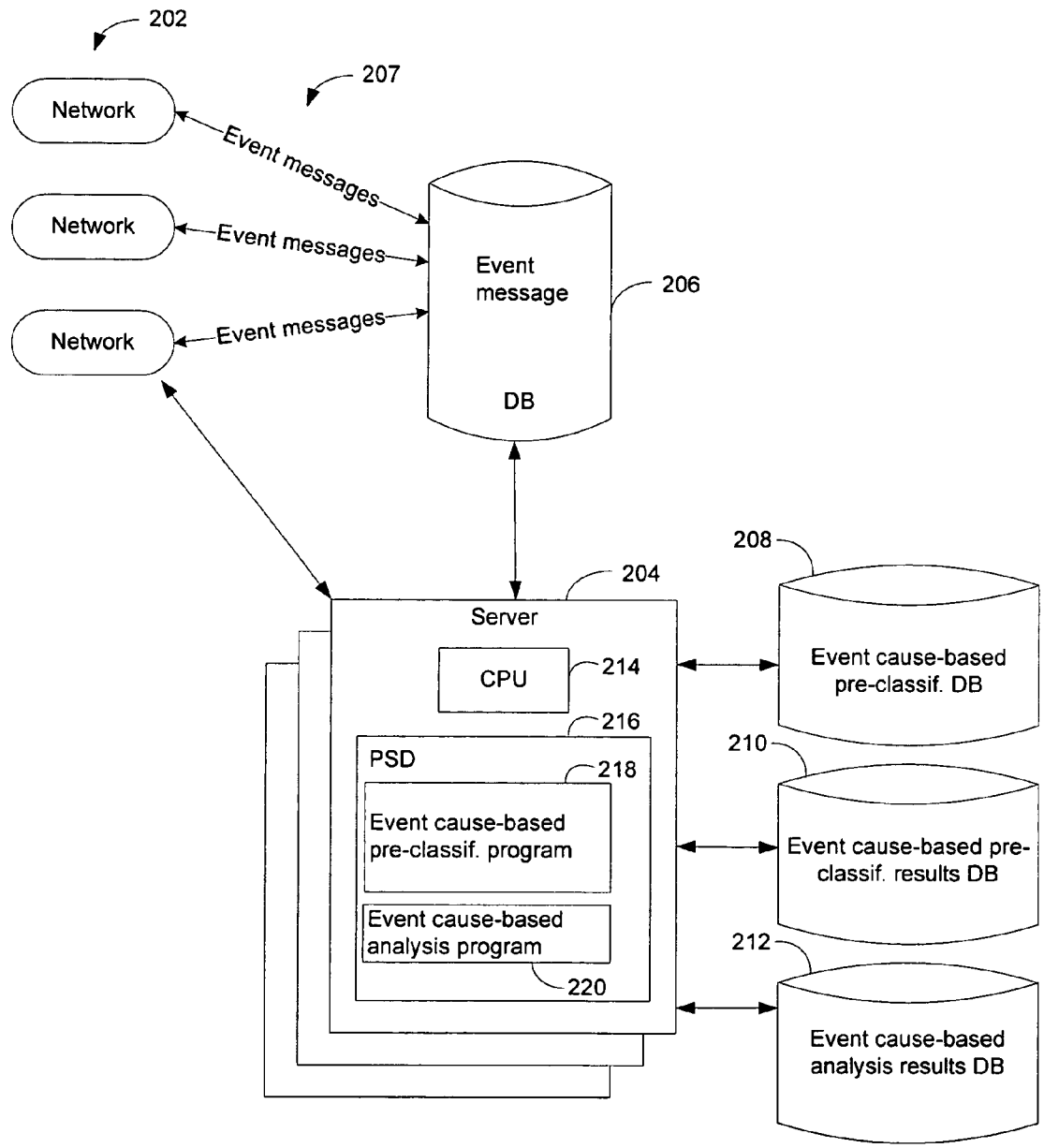
FIG. 2 is a block diagram of a networked computer system according to one embodiment of the invention.

FIG. 2 is a block diagram of a networked computer system 200 according to one embodiment of the invention. The system 200 includes one or more computer networks (three or shown) 202, one or more server computers 204, one or more event message databases 206, one or more event cause-based preliminary classification databases 208 (pre-classification, as used herein, means preliminary classification), one or more event cause-based preliminary classification results databases 210, and one or more event cause-based analysis results databases 212. The databases 206, 208, 210, 212 may be queryable, relational databases. Additionally, the system 200 can include multiple networks, which can include one or more local area networks, one or more wide area networks, and may also include a connection to the Internet, although embodiments of the invention are contemplated in which no connection to the Internet is provided. Event messages 212 stored in the networks 202, such as by being stored in nodes thereof, are sent to and stored in the event message database 206.

While the databases 206, 208, 210, 212 and the server computer 204 are depicted outside of the networks 212, in some embodiments, the databases 206, 208, 210, 212 and the server computer 204 can be located inside one or more of the networks 202. Additionally, while the databases 206, 208, 210, 212 are depicted outside the server computer 204 and the networks 202, the databases 206, 208, 210, 212 can also be located or partially located in the server computer 204 or one or more of the networks 202 or elsewhere. Furthermore, while the databases 206, 208, 210, 212 are depicted separately, they could be merged or partially merged with each other or other databases.

The server computer 204 includes one or more central processing units (CPUs) 214 and one or more data storage devices 216. Other computers in the system 200 also include one or more CPUs and one or more data storage devices.

The data storage device 216 of the server computer 204, as well as the databases 206, 208, 210, 212 and other computers or components of the system 200, may comprise various amounts of RAM for storing computer programs and other data. In addition, both the server computer 204 and other computers in the system 200 may include other components typically found in computers, including one or more output devices such as monitors, other fixed or removable data storage devices such as hard disks, floppy disk drives and CD-ROM drives, and one or more input devices, such as mouse pointing devices and keyboards.

Generally, the server computer 204 and other computers in the system 200 operate under and execute computer programs under the control of an operating system, such as Windows, Macintosh, UNIX, etc.

The data storage device 216 of the server computer 204 includes an event cause-based preliminary classification program 218 and an event cause-based analysis program 220.

The event cause-based preliminary classification program 218 is intended to broadly represent all programming, applications, software, APIs, or other tools, used to implement methods for preliminary cause-based classification according to embodiments of the invention. Additionally, the event cause-based analysis program 220 is intended to broadly represent all programming, applications, software, APIs, or other tools, used to implement methods for event cause-based analysis according to embodiments of the invention.

While the programs 218, 220 are located in the server computer 204 in the depicted embodiment, they could be located elsewhere, or can include portions or components distributed among different hardware, devices, software, and locations.

In the embodiment depicted, event messages 207 are sent from the networks 202 to be received and stored in the event message database 206. Each of the event messages 207 relates to an event, which can include an event or a condition, associated with the network from which it came, such as being associated with a particular node in one of the networks 202. An event message, for example, may be stored in a node of a network and, immediately or eventually, and alone or with a group of other messages, is sent to the event message database 206. Event messages may be processed, parsed, or otherwise manipulated either prior to being stored in the event message database 206, or before being sent to the server computer 204, or both.

The event cause-based preliminary classification program 218 is used to perform cause-based preliminary classification of events based on associated event messages obtained from the event message database 206. In the embodiment depicted, the event cause-based preliminary classification database 208 is used to store information used in performing the cause-based preliminary classification of events, such as by providing a catalog associating particular event messages or event message characteristics with most likely cause-based classifications. Result information, relating to results of the preliminary classification of the event, is stored in the event cause-based preliminary classification results database 210.

The event cause-based analysis program 220 is used to perform cause based analysis relating to the event, using the results of the preliminary classification of the event as obtained from the event cause-based preliminary classification database 210. Result information regarding the cause-based analysis, such as determined actual cause-based classifications or cause relevancy of events or conditions, is stored in the event cause-based analysis database 212.

Event cause-based preliminary classification and event cause-based analysis are described herein primarily with reference to computerized methods and systems, but can, in some embodiments, include human or by-hand components.
* * *

Herein, a distinction is made between event cause-based preliminary classification and event cause-based analysis. Event cause-based preliminary classification of an event is performed without reference to, consideration of, or taking account of any factors, events, conditions, or cause-related information associated with the network from which the event message came, other than factors, events, or conditions which are indicated by the event message itself.

Event cause-based analysis, by contrast, includes determination of, or attempted determination of, the actual causal classification or causal relevance of an event associated with an event message. Furthermore, the event cause-based analysis does utilize factors, events, conditions, or cause-related information associated with the network from which the event message came, above and beyond factors, events, and conditions which are indicated by the event message itself (although factors or conditions indicated by the event message itself may also be utilized). For example, event cause-based analysis may include analyzing an event in the context of other event messages or their associated events, such as event messages or events occurring at different nodes in a network than a node at which the event associated with the event message occurred or is associated, or other conditions or factors relating to the network or its components.

For instance, for a multi-nodal computer network, a first event message may be stored in a particular node, then sent to an event message database. Event cause-based preliminary classification can include performing preliminary classification of an event or condition associated with the first event message. The preliminary classification is made without regard or reference to, for example, other event messages that may have occurred in the network which may be associated with the first event message, such as events or conditions at other nodes in the network which may have in fact caused or been caused by the event or condition associated with the first event message.

Performing preliminary classification can include utilizing information from the event cause-based preliminary classification database 208. For example, the event cause-based preliminary classification database 208 can include a list or catalogue of event messages and associated most likely cause-related classifications thereof. The associated most likely classifications may be obtained, for example, from empirical evidence or statistics indicating, in the past, how often an event message or event message type was associated with each of a number of cause-based classifications, and indicating which classification the event message was most often associated with, from among the given set of possible or allowed classifications.

In some embodiments, preliminary classification of an event message can include parsing, analyzing, or using fields, portions, or properties of the event message. For example, an event message may include a time stamp indicating a point in time at which an associated event occurred. Such information may be useful in performing preliminary classification of the event. For example, the time of day at which an event occurs may bear upon a most likely classification of the event.

In some embodiments, the preliminary classification may be made using algorithms that may include one or more data mining algorithms. However, the preliminary classification, including any analysis, data mining, or algorithms associated therewith, is performed entirely without reference to, consideration of, or taking account of any factors, events, conditions, or cause-related information associated with the network from which the event message came, other than factors, events, or conditions which are indicated by the event message itself.

Event cause-based analysis can include determining or attempting to determine causal relevance of the first event, and can include determining an actual cause-based classification of the first event, with reference to or consideration of factors, events, conditions, or cause-related information associated with the network beyond such information indicated by the first event message. For example, in a multi-nodal computer network, event cause-based analysis can include analyzing the first event based on other network-associated event messages, events, or conditions associated with other nodes of the network, which may be determined to have caused (or not to have caused), or have been caused by (or not caused by), the event or condition associated with the first event message.

Event cause-based analysis, according to embodiments of the invention, is facilitated by event cause-based preliminary classification. For example, results of preliminary classification of a first event may be used to increase the efficiency, accuracy, or effectiveness of subsequent cause-based analysis relating to the first event. For instance, cause-based analysis may use the preliminary classification of the first event to provide an input to one or more algorithms, or by providing a useful starting point or initial presumption for the analysis. In some embodiments, for example, the preliminary classification facilitates cause-based analysis by providing being utilized to indicate a most appropriate analysis method or algorithm, or initial method or algorithm, based on the preliminary classification.

Figure 3:
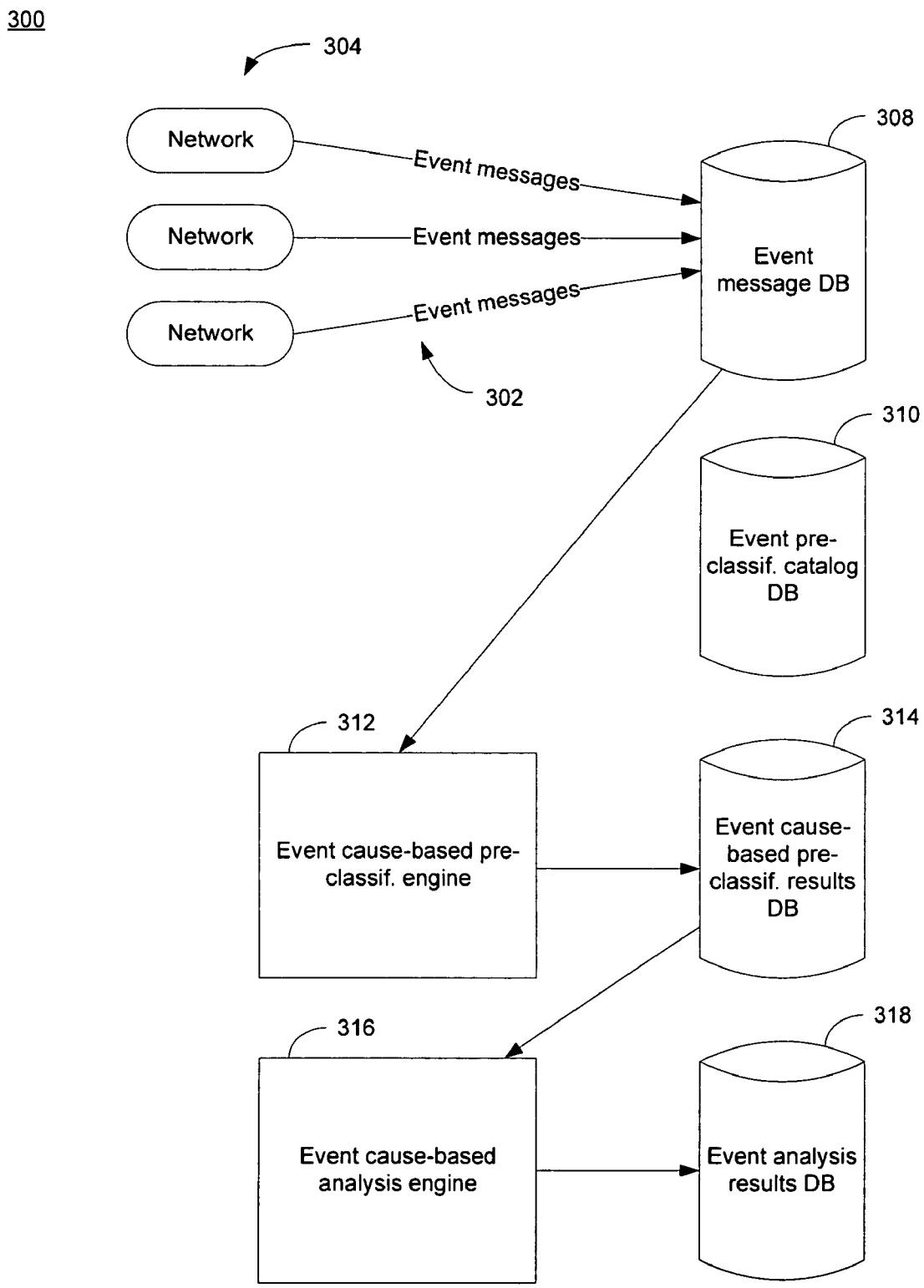
FIG. 3 is a block diagram of a networked computer system according to one embodiment of the invention.

FIG. 3 is block diagram depicting a networked computer system 300 according to one embodiment of the invention. As depicted, event messages 302 are sent from networks 304 to the event message database 308.

The event messages are then utilized by an event cause-based preliminary classification engine 312, which may be a software-based engine stored in one or more server computers, for example. The preliminary classification engine performs cause-based preliminary classification of events based on associated event messages. In the embodiment depicted, in performing the preliminary classification, the preliminary classification engine 312 utilizes information obtained from an event preliminary classification catalog database 310. In some embodiments, the catalog database 312 contains information associating certain event messages, event message types, event message portions, or event message characteristics with a most likely cause-based preliminary classification of associated events.

For example, the preliminary classification engine 312 may look up or attempt to look up an event message in the catalog database 312, for example, by finding or attempting to find the event message or message type in the catalog, and may perform event cause-based pre-Express classification of an event by using the listed most likely preliminary classification of the associated event message or event message type.

In other embodiments, preliminary classification may be more complex. For example, a preliminary classification database may be used that contains probabilistic or stochastic information relating to probabilities or statistics of particular event messages, event message characteristics, etc. being associated with a particular cause-based classification. The preliminary classification engine may perform preliminary classification by using one or more algorithms to determine a most likely classification based on stochastic information obtained from the database.

Results of preliminary classification are sent to and stored in the event cause-based preliminary classification results database 314.

Following event cause-based preliminary classification, an event cause-based analysis engine 316, which may be a software-based engine stored in one or more server computers, for example, is used to perform cause-based analysis relating to the event associated with the event message. The event cause-based analysis engine 316 uses, as input, the results of event preliminary classification relating to the event message associated with the event. The event cause-based analysis engine 316 also uses, as further input, information regarding events, conditions, factors, or other circumstances relating the network in association with which the event occurred, which information is not indicated by the event message itself. The event cause-based analysis engine 316 determines, or attempts to determine, actual cause-based relevancy of the event. The results of the cause-based analysis are stored in the event analysis results database 318.

In some embodiments of the invention, cause-based classifications include the following: root cause, symptom, singularity, information, and unknown. These classifications are described further below. It is to be understood, however, that other or different cause-based classifications could be utilized.

A "root cause" includes a first event or condition that has an effect that results in a degraded condition or failure (which degraded condition or failure is not the first event or condition) within the network (or computer). For example, if a frame relay interface fails, virtual circuits (DCLIs) traversing that interface will fail. The frame relay failure is the root cause of the virtual circuit failures.

A "symptom" includes a first event or condition that was caused by a degraded condition or failure (which degraded condition or failure is not the first event or condition). For example, with respect to the failed frame relay interface mentioned above, the virtual circuit failures are symptoms of the frame relay interface failure. It is noted that being a symptom does not necessarily mean that the event or condition is not a real problem.

A "singularity" includes an event or condition that is not directly caused by any other degraded condition or failure, but also does not cause another degraded condition or failure. In some embodiments, the singularity classification is itself not utilized as a preliminary classification, or as an actual classification. For example, in performing preliminary classification, an event or condition may be first marked as a singularity as part of, and prior to final, preliminary classification of the event. In such instances, the event or condition may be subject to further analysis based on the associated event message to determine its preliminary classification. The further analysis may be performed by a program or engine, or by human review and determination (such as by a system or network manager or operator).

"Information" events or conditions include events or conditions that are non-fault related but that might be of interest or use to, for instance, a system or network manager or operator. Information events or conditions further include events or conditions such as, or that indicate, clearing or resolution of a previously occurring fault-related event or condition.

"Unknown" events or conditions include events or conditions that are not determined to belong to (or in the case of preliminary classification, are not determined to have a preliminary classification as) any other classification. In some embodiments, an event or condition is assigned a preliminary classification of unknown if the event or condition cannot be determined to most likely be any particular other classification. In other embodiments, unknown events or conditions are considered to not be preliminarily classifiable.

As mentioned with reference to FIG. 3, in some embodiments, an event preliminary classification catalog database 312 may be used by the event preliminary classification engine 310. The catalog database 312 can include one or more databases, text files, or Internet-based services. It is to be noted that, in some embodiments, a human performs or partially performs preliminary classification rather than a computer or engine. Furthermore, in such cases, a non-computer based catalog, such as a paper catalog, for example, can be used instead of or in addition to an event preliminary classification catalog.

A preliminary classification catalog can be implemented using correlation, analysis, or a combination thereof, for example. In some embodiments, the following rules or guidelines are used in implementing a preliminary classification catalog.

A Root cause preliminary classification may be associated in the catalog with events or conditions (as indicated by an event message) that are not known to be caused by any other detectable event or condition. Root cause classification, for example, may apply to many physical events such as a card being pulled, device shutdown, or lost power.

A Symptom preliminary classification may be associated in the catalog with events or conditions that are always caused by another detectable event or condition. Such events or conditions may indicate degraded conditions or failures of high level entities or processes. For example, an OSPF adjacency loss event may always be caused by some lower level failure, such as an interface failure, device failure, or other network congestion or failure event or condition.

A Singularity preliminary classification may be associated in the catalog with events or conditions that are or indicate a degraded condition or failure that is known not to be able to be a root cause, and cannot be caused by another event or condition. For example, a singularity may include an accounting file full condition on some Cisco Systems, Inc. equipment. This particular condition eventually results under normal operating conditions, and therefore can be considered not to be caused by some other event or condition. Furthermore, the condition does not cause any fault-related condition other than the condition that it indicates, which is that the accounting file cannot be written to.

An information preliminary classification may be associated in the catalog with events or conditions that do not represent degraded conditions or failures, and events or conditions that indicate the clearing or resolution of previously occurring fault-related events or conditions. For example, information events or conditions can include events or conditions such as neighbor adjacency establishment events, successful call establishment messaging, and physically related recovery messaging.

Figure 4:
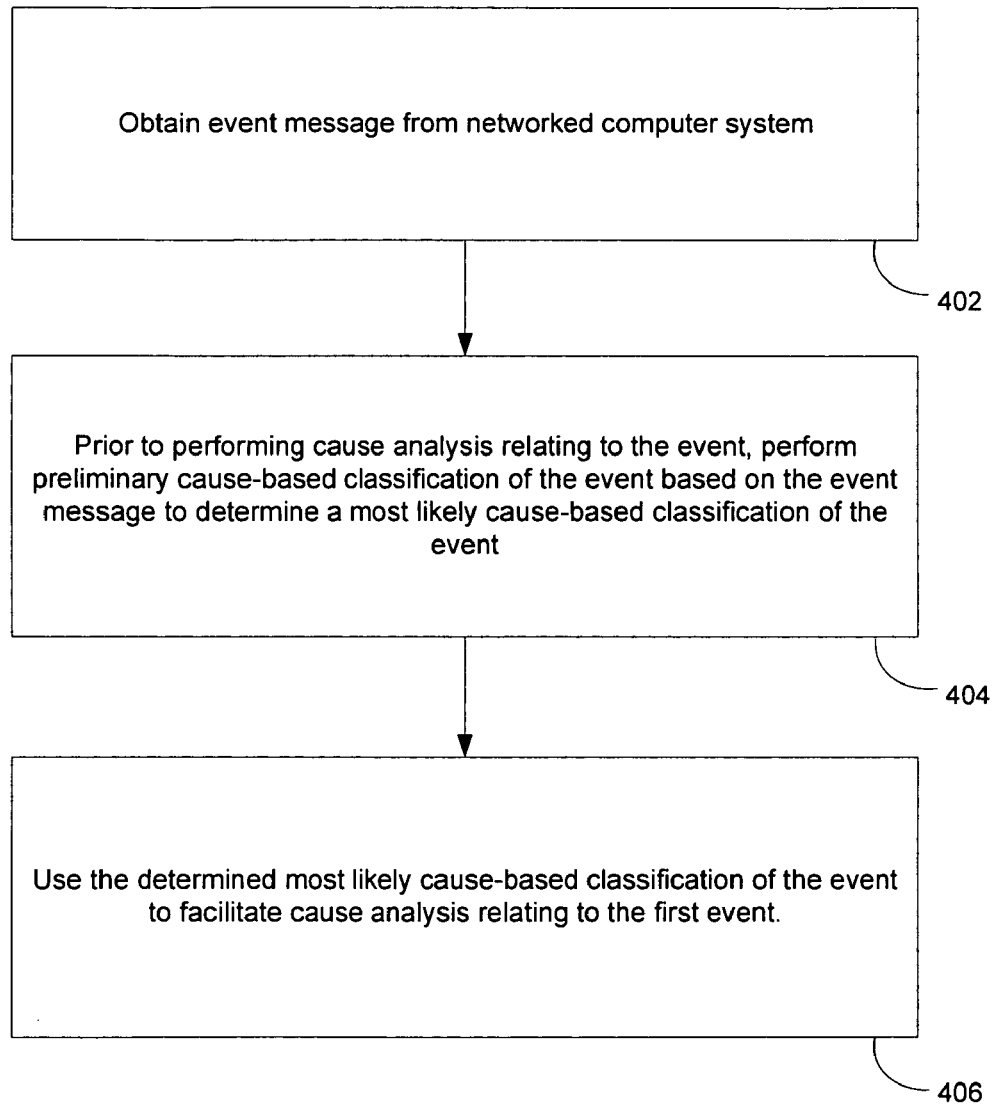
FIG. 4 is a flow diagram of a method according to one embodiment of the invention.

FIG. 4 is a flow diagram depicted a method 400 according to one embodiment of the invention. At step 402, an event message is obtained from a networked computer system. Step 402 can include, for example, an event cause-based preliminary classification program of a server computer obtaining an event message from the network.

At step 404, prior to performing cause-based analysis relating to the event associated with the event message, the event cause-based preliminary classification program performs cause-based preliminary classification of the event based on the event message, to determine a most likely classification of the event. Step 404 can include, for example, looking up the event message or event message type in a catalog that indicates the most likely cause-based classification of the associated event, from among a number of enumerated classifications.

At step 406, a determined most likely classification of the event associated with the event message is used to facilitate cause-based event analysis relating to the event. Step 406 can include, for example, using the determined preliminary classification of the event as well as other information regarding conditions or other events in the associated network not indicated by the event message to determine cause-based relevancy of the event. Determining cause-based relevancy can include determining an actual cause-based classification of the event.

Figure 5:
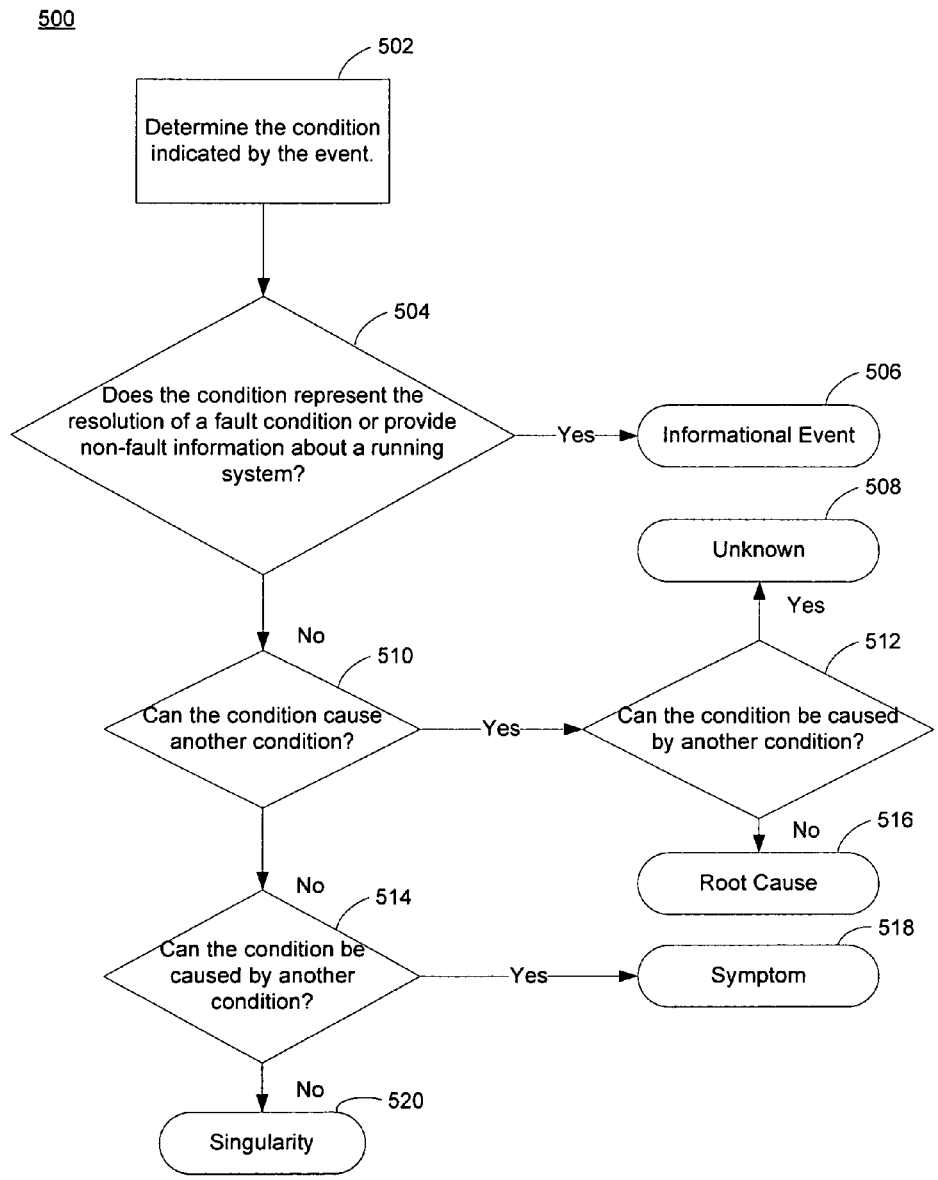
FIG. 5 is a flow diagram of a method according to one embodiment of the invention.

FIG. 5 is a flow diagram depicting a method 500 according to one embodiment of the invention. At step 502, an event cause-based preliminary classification program is used to determine a condition (which can be an event or a condition) indicated by an event associated with a particular event message.

At step 504, the method queries whether the condition represents resolution of the fault condition or provides non-fault information about a running system in the associated network. If the answer is "yes", the method 500 proceeds to step 506, at which the event associated with the event message is determined to have a preliminary classification of an informational event. This result (or other results) may then be sent to and stored in a cause-based event pre-classification database, to be used to facilitate subsequent cause-based analysis. If the answer is "no", the method 500 proceeds to step 510.

At step 510, the method 500 queries whether the condition indicated by the event can cause another condition. If the answer is "yes", then the method 500 proceeds to step 512. If the answer is "no", then the method proceeds to step 514.

At step 512, the method 500 queries whether the condition can be caused by another condition. If the answer is "yes", then the method proceeds to step 508, at which the event is determined to have a preliminary classification of "unknown".

At step 514, the method 500 queries whether the condition can be caused by another condition. If the answer is "yes" then the method 500 proceeds to step 518 at which the event is determined to have a preliminary classification of "symptom". If the answer is "no", then the method 500 proceeds to step 520, at which the event is determined to have a preliminary classification of "singularity".

The invention claimed is:

1. A method for facilitating cause-based analysis relating to events in a networked computer system, the method comprising:

obtaining, from the networked computer system, a plurality of event messages, wherein each of the plurality of event messages relate to an event within the networked computer system, and the plurality of event messages comprising a first event message associated with a first event;

prior to performing cause-based analysis relating to the first event, performing preliminary cause-based classification of the first event to determine a preliminary cause-based classification of the first event from among a plurality of possible cause-based classifications, wherein the preliminary cause-based classification is performed based on the first event message;

facilitating cause-based analysis relating to the first event utilizing the determined preliminary cause-based classification of the first event; and wherein performing preliminary cause-based classification comprises determining a preliminary classification for the first event, and wherein preliminary classifications comprising root cause classification, symptom classification, and information classification.

2. The method of claim 1, wherein performing cause-based preliminary classification comprises utilizing information obtained from one or more cause-based preliminary classification databases to facilitate associating the first event with an appropriate preliminary classification.

3. The method of claim 1, wherein the one or more cause-based preliminary classification databases comprises one or more catalogs, and wherein the one or more catalogs list event messages in association with corresponding appropriate preliminary classifications.

4. The method of claim 1, wherein performing cause-based preliminary classification comprises determining a most likely classification of the first event.

5. The method of claim 1, wherein results of cause-based preliminary classification are used in performing cause-based analysis to determine an actual cause-based classification of the first event.

6. The method of claim 5, wherein results of cause-based preliminary classification are provided as input to be used in performing cause-based analysis.

7. The method of claim 1, wherein the cause-based analysis comprises root cause analysis.

8. The method of claim 1, wherein performing cause-based preliminary classification comprises determining an appropriate preliminary classification for the first event, and wherein preliminary classifications include root cause classification, symptom classification, information classification, singularity classification, and unknown classification.

9. The method of claim 1, comprising performing cause-based analysis relating to the first event to determine an actual cause-based classification of the first event.

10. The method of claim 1, wherein facilitating the cause-based analysis comprises at least one of increasing the efficiency of the cause-based analysis and increasing the accuracy of the cause-based analysis.

* * * * *